(12) United States Patent
Samuel et al.

(10) Patent No.: US 11,196,832 B2
(45) Date of Patent: Dec. 7, 2021

(54) SYSTEM AND METHOD FOR PROVIDING UEFI PROTOCOL ACCESS CONTROL

(71) Applicant: DELL PRODUCTS, LP, Round Rock, TX (US)

(72) Inventors: Balasingh Ponraj Samuel, Round Rock, TX (US); Baris Tas, Austin, TX (US); Ricardo L. Martinez, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 386 days.

(21) Appl. No.: 16/292,855

(22) Filed: Mar. 5, 2019

(65) Prior Publication Data

US 2020/0287981 A1    Sep. 10, 2020

(51) Int. Cl.
*G06F 7/04* (2006.01)
*H04L 29/08* (2006.01)
*H04L 29/06* (2006.01)
*H04L 9/08* (2006.01)

(52) U.S. Cl.
CPC ............ *H04L 67/26* (2013.01); *H04L 9/0869* (2013.01); *H04L 63/062* (2013.01); *H04L 63/1441* (2013.01)

(58) Field of Classification Search
CPC ..... H04L 67/26; H04L 63/062; H04L 9/0869; H04L 63/1441; H04L 67/34
See application file for complete search history.

(56) References Cited

U.S. PATENT DOCUMENTS

| | | | |
|---|---|---|---|
| 9,235,404 B2 | 1/2016 | Cavalaris et al. | |
| 2004/0117568 A1* | 6/2004 | Zimmer | G06F 9/4401 711/154 |
| 2008/0028200 A1* | 1/2008 | Polyudov | G06F 9/4411 713/2 |
| 2010/0161668 A1* | 6/2010 | Strenge | G06F 16/22 707/791 |
| 2015/0235030 A1* | 8/2015 | Chaiken | G06F 21/572 726/22 |
| 2017/0010875 A1 | 1/2017 | Martinez et al. | |
| 2017/0147329 A1 | 5/2017 | Shutt et al. | |
| 2018/0341774 A1* | 11/2018 | Yao | G06F 21/44 |

* cited by examiner

*Primary Examiner* — Phy Anh T Vu
(74) *Attorney, Agent, or Firm* — Larson Newman, LLP

(57) ABSTRACT

A method includes receiving a request from a protocol publisher to install a protocol at the protocol database, the request including a global unique identifier (GUID) and a first protocol pointer. The GUID and the first protocol pointer are stored at an entry at a protocol database. A root key received from the protocol publisher is stored at the entry at the protocol database. A request including the GUID is received from a protocol consumer, and in response, the protocol consumer is provided with a random number. A reference GUID is generated based on the random number and the root key, and the reference GUID is stored at the entry of the protocol database.

10 Claims, 5 Drawing Sheets

SYSTEM AND METHOD FOR PROVIDING UEFI PROTOCOL ACCESS CONTROL

FIELD OF THE DISCLOSURE

This disclosure generally relates to information handling systems, and more particularly relates to UEFI protocol access control.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. Information handling systems are increasingly relied upon for personal and business activities. Accordingly, maintaining security at information handling systems is important.

BRIEF DESCRIPTION OF THE DRAWINGS

Embodiments incorporating teachings of the present disclosure are shown and described with respect to the drawings presented herein, in which.

The use of the same reference symbols in different drawings indicates similar or identical items.

SUMMARY

A method may include receiving a request from a protocol publisher to install a protocol at a protocol database, the request including a global unique identifier (GUID) and a first protocol pointer. The GUID and the first protocol pointer are stored at an entry at the protocol database. A root key received from the protocol publisher is stored at the entry at the protocol database. A request including the GUID is received from a protocol consumer, and in response the protocol consumer is provided with a random number. A reference GUID is generated based on the random number and the root key, and the reference GUID is stored at the entry of the protocol database.

DETAILED DESCRIPTION

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

FIGS. 1-6 illustrate techniques for establishing a chain of trust link between the publisher of a firmware protocol and legitimate consumers of the firmware protocol. As disclosed herein, a protocol access controller implements enhanced procedures for installing and locating protocols. In particular a protocol publisher provides the protocol access controller with a root key that is stored at a protocol database along with the conventional global unique identifier and protocol pointer, and a protocol consumer must possess the same root key. The protocol access controller and the protocol consumer can use the root key to generate a secure protocol identifier. The protocol consumer must provide the secure protocol identifier to the protocol access controller before the protocol consumer can receive a pointer to a corresponding protocol interface.

Figure 1:
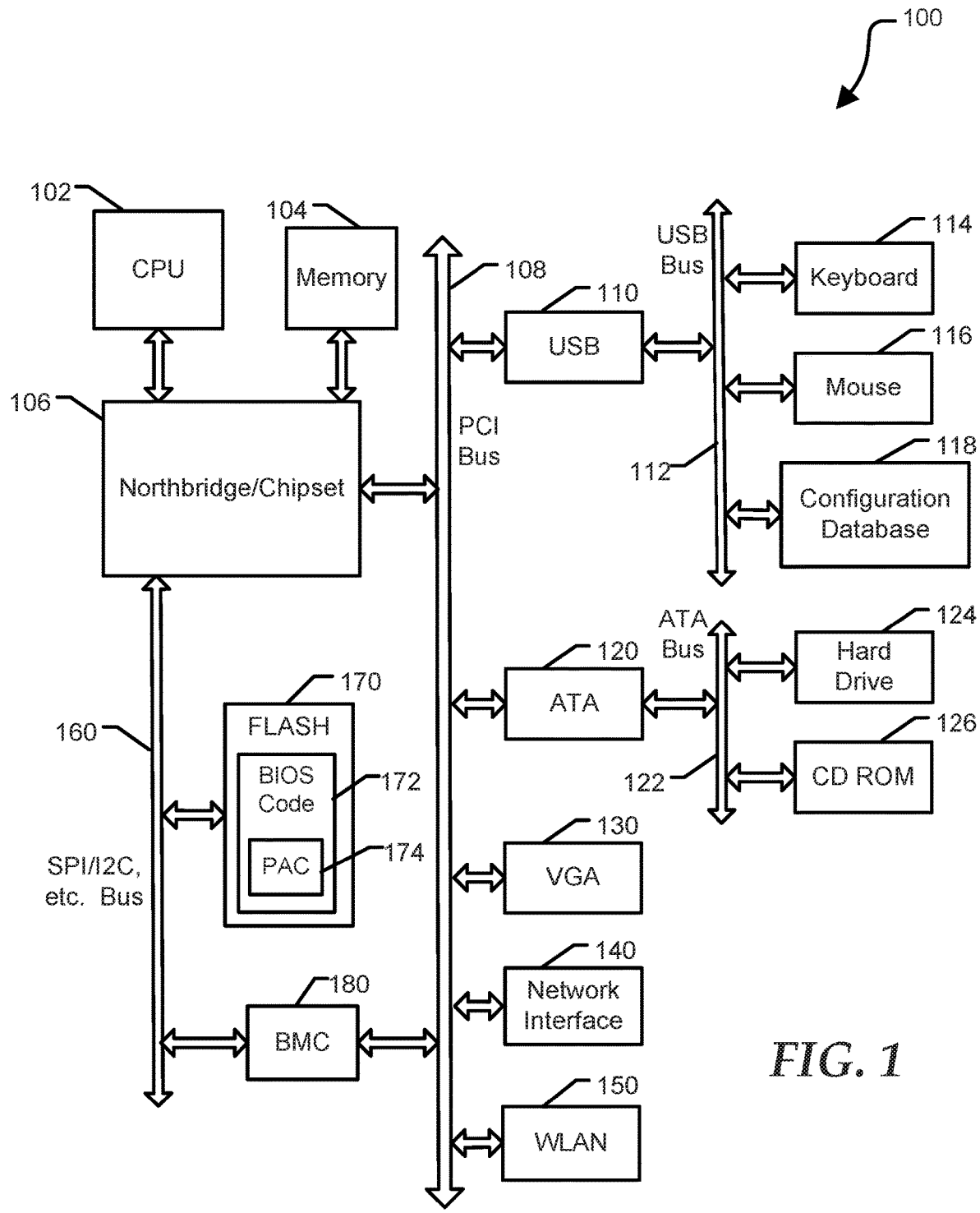
FIG. 1 is a block diagram illustrating an information handling system including a protocol access controller in accordance with a specific embodiment of the present disclosure.

FIG. 1 illustrates an information handling system 100 including a processor 102, memory devices 104, a platform controller hub (PCH)/chipset 106, a PCI bus 108, a universal serial bus (USB) controller 110, a USB 112, a keyboard device controller 114, a mouse device controller 116, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170, and a baseboard management controller (BMC) 180. NVRAM 170 can store a basic input/output system (BIOS) 172, which further includes a protocol access controller (PAC) 174. As disclosed herein, PAC 174 can bind a protocol publisher with a corresponding consumer of the protocol, thereby preventing a malicious or otherwise unauthorized access to the protocol. PAC 174 can implemented using firmware instructions and a circuit, for example a circuit including CPU 102 and NVRAM 170.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of PCH 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BMC 180 can be configured to provide out-of-band access to devices at information handling system 100. As used herein, out-of-band access refers to operations performed independent of an operating system executing at system 100, including operations performed prior to execution of BIOS 172 by processor 102 to initialize operation of system 100. BMC 180 can provide a network interface, a graphical user interface (GUI) and an application programming interfaces (API) to support remote management of system 100. In an embodiment, BMC 180 can include one or more proprietary or standardized bus interfaces, for example USB, I2C, PCI, and the like.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

In an embodiment, the BIOS 172 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100, including support of the techniques described below.

Initialization of information handling system 100, herein referred to as a UEFI boot flow, can be divided into a sequence of phases including a pre-EFI initialization (PEI) phase, followed by a driver execution environment (DXE) phase, a boot device selection (BDS) phase, and a run time (RT) phase. The UEFI boot sequence can include additional phases. UEFI images can include UEFI drivers, applications, and bootloaders, and are a class of files defined by UEFI that contain executable code. A UEFI bootloader, and a boot manager in particular, is a firmware policy engine that is in charge of loading the operating system loader and all necessary drivers. UEFI applications can be loaded by the boot manager or by other UEFI applications to accomplish platform specific tasks within the boot services environment.

A UEFI driver is a module of code typically inserted into firmware via protocols interfaces. UEFI drivers can be loaded by the boot manager, firmware conforming to the UEFI specification, or by other UEFI applications. Each UEFI image includes one or more UEFI protocols. A UEFI protocol, also referred to as a protocol interface, is much like a class in object-oriented programming, providing an interface structure containing data definitions, and a set of functions, such as functions to access a device. Each UEFI protocol is identified by a global unique identifier (GUID), which is a 128-bit value, and an interface pointer.

Figure 2:
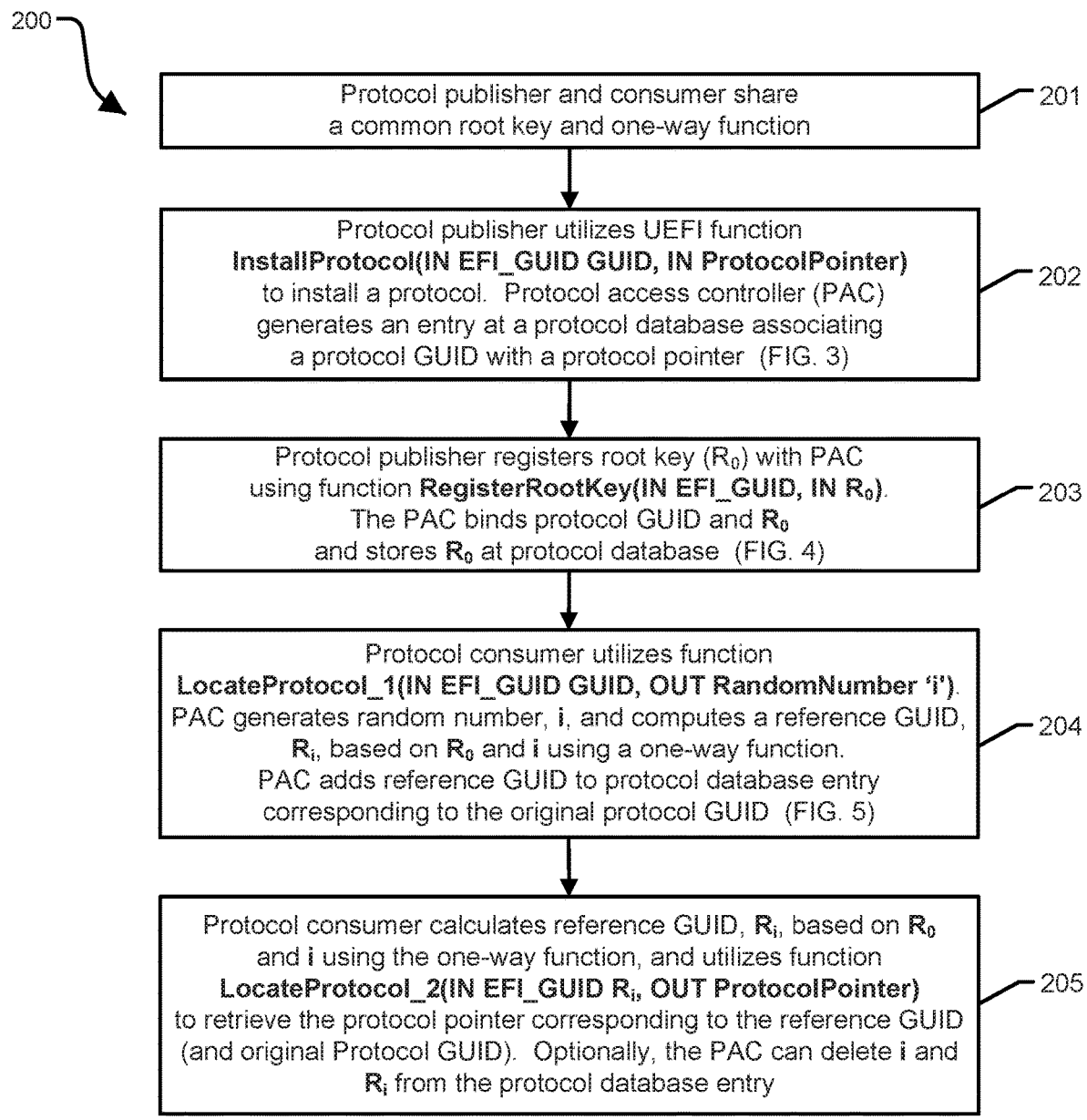
FIG. 2 is a flow diagram illustrating operation of the protocol access controller of FIG. 1 according to a specific embodiment of the present disclosure.

FIG. 2 shows a method 200 for installing and locating protocols according to a specific embodiment of the present disclosure. Method 200 can be implemented, at least in part, by PAC 174 of FIG. 1. Method 200 begins at block 201 where a protocol publisher and a protocol consumer share a common root key. Each protocol publisher can have its own root key that is unique to each publisher. Only intended consumers of the published protocol are provided with the corresponding root key. In addition, the protocol publisher and the protocol consumer are provided with a one-way function that can be used to encode information as described below. Method 200 continues at block 202 where a protocol publisher utilizes a UEFI function, for example InstallProtocol(IN EFI_GUID GUID, IN ProtocolPointer) to install a protocol at a protocol database. PAC 174 is configured to generate an entry at the protocol database that associates a protocol GUID with a protocol pointer, as illustrated at FIG. 3.

Figure 3:
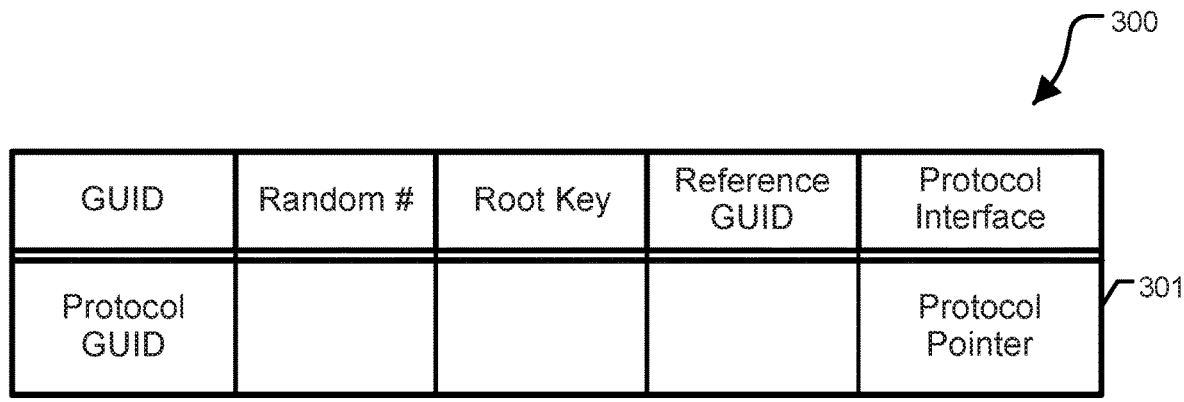
FIG. 3 is a table illustrating a protocol database according to a specific embodiment of the present disclosure.

FIG. 3 shows a protocol database 300 according to a specific embodiment of the present disclosure. Protocol database 300 can be can include or can be represented by a table having individual columns corresponding to a protocol GUID, a random number, a root key, a reference GUID and a protocol interface. Each row of the table represents an entry at database 300, such as entry 301. The protocol publisher can execute the InstallProtocol(IN EFI_GUID GUID, IN ProtocolPointer) function, which specifies the protocol GUID and the protocol pointer to be stored at entry 301.

Figure 4:
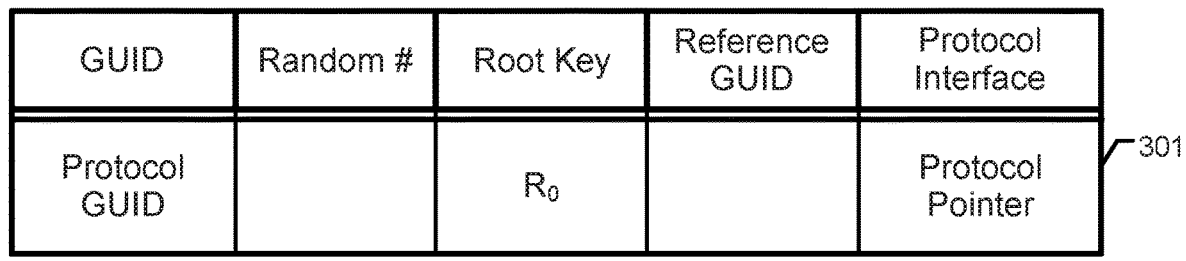
FIG. 4 is a table illustrating a protocol database according to another embodiment of the present disclosure.

Returning to FIG. 2, method 200 continues at block 203 where the protocol publisher registers root key ($R_0$) with PAC 174 using a UEFI function, for example RegisterRootKey(IN EFI_GUID, IN $R_0$), to bind the protocol GUID with the root key $R_0$ at the protocol database, as illustrated at FIG. 4.

FIG. 4 shows the protocol database 300 of FIG. 3 according to a specific embodiment of the present disclosure. In particular, FIG. 4 illustrates the protocol database 300 after the protocol publisher has used the RegisterRootKey(IN EFI_GUID, IN $R_0$) function to update entry 301 to include the root key $R_0$.

Returning to FIG. 2, method 200 continues at block 204 where a protocol consumer, for example a driver, utilizes a UEFI function, for example LocateProtocol_1(IN EFI_GUID GUID, OUT RandomNumber 'i'), to request a random number, i. In response to executing this function, PAC 174 generates the random number, i, which is provided to the protocol consumer. In addition PAC 174 computes a reference GUID, $R_i$, based on the root key, $R_0$, and the random number, i, using a one-way function, such as a cryptographic hash function. As used herein, a one-way function is a function that is easy to compute on every input, but hard to invert given the image of a random input. Here, "easy" and "hard" are to be understood in the sense of computational complexity theory, specifically the theory of polynomial time problems. PAC 174 adds the reference GUID, $R_i$, to protocol database entry 301, corresponding to the original protocol GUID, as illustrated at FIG. 5.

Figure 5:
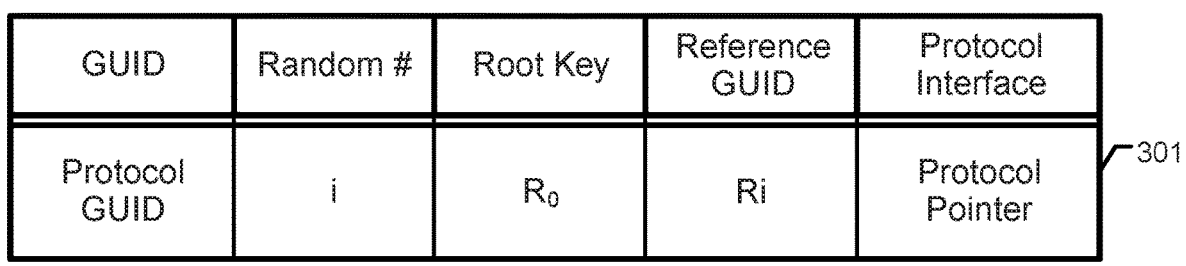
FIG. 5 is a table illustrating a protocol database according to still another embodiment of the present disclosure.

FIG. 5 shows the protocol database 300 of FIG. 3 according to a specific embodiment of the present disclosure. In particular, FIG. 5 illustrates the protocol database 300 after the protocol publisher has used the LocateProtocol_1(IN EFI_GUID GUID, OUT RandomNumber 'i') function to update entry 301 with the random number, i, and the reference GUID, $R_i$.

Returning to FIG. 2, method 200 completes at block 205 where the protocol consumer calculates the reference GUID, $R_i$, based on the root key, $R_0$, and the random number, i, using the one-way function. The protocol consumer then utilizes a UEFI function, for example LocateProtocol_2(IN EFI_GUID $R_i$, OUT ProtocolPointer), to retrieve the protocol pointer corresponding to the reference GUID (and to the original Protocol GUID) by providing PAC 174 with the reference GUID, $R_i$. In an embodiment, PAC 174 can delete the random number, i, and the reference GUID, $R_i$, from entry 301 of protocol database 300 to avoid playback attack. A playback attack, also referred to as a replay attack, is a form of network attack in which a data transmission is maliciously intercepted to extract a password, hash, and the like. By incorporating the random number, i, when generating the reference GUID, each access of the protocol pointer includes a unique reference GUID.

Figure 6:
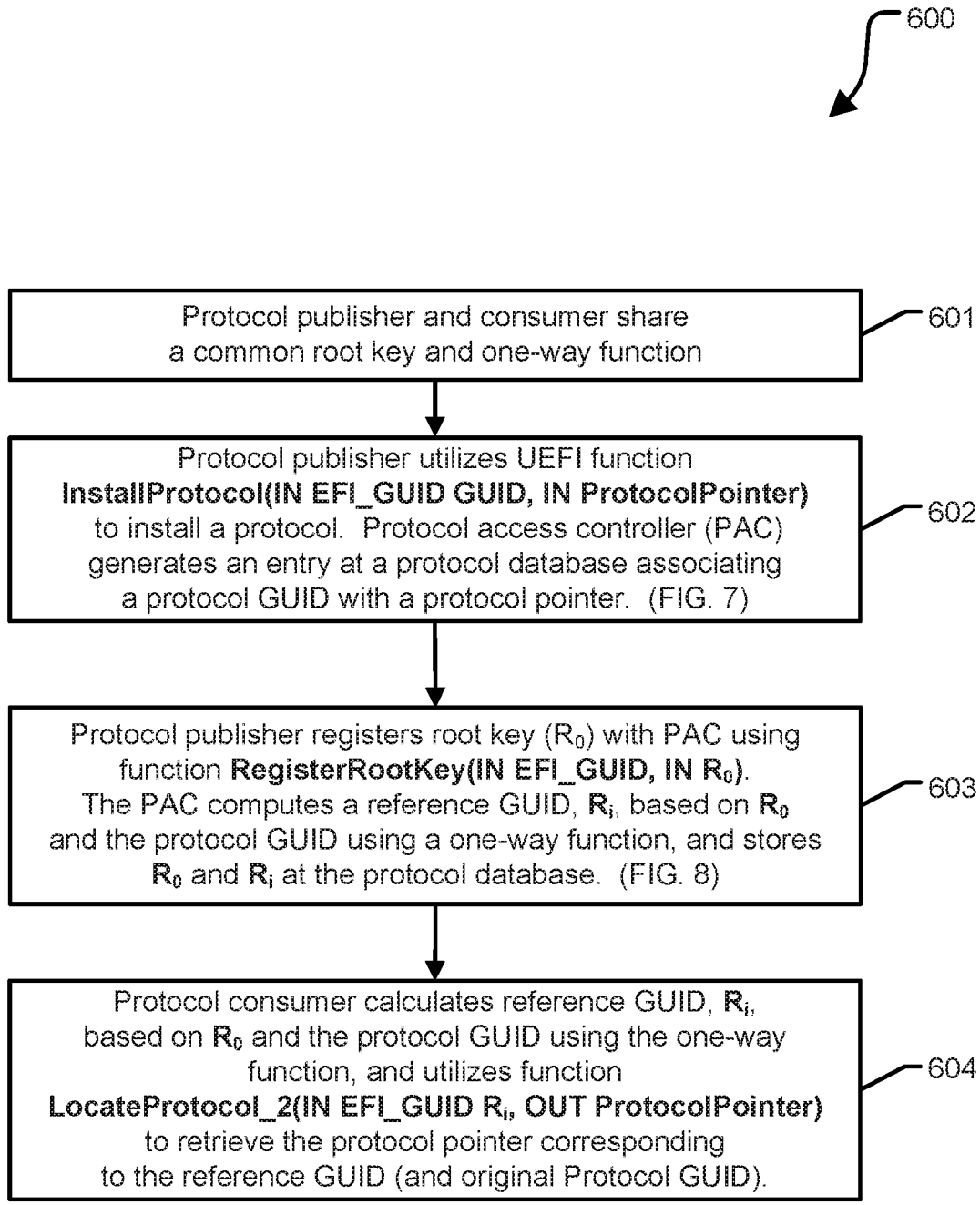
FIG. 6 is a flow diagram illustrating operation of the protocol access controller of FIG. 1 according to another embodiment of the present disclosure.

FIG. 6 shows a method 600 for installing and locating protocols according to another embodiment of the present disclosure. Method 600 can be implemented, at least in part, by PAC 174 of FIG. 1. Method 600 begins at block 601 where a protocol publisher and a protocol consumer share a common root key. Each protocol publisher can have its own root key that is unique to each publisher. Only intended consumers of the published protocol are provided with the corresponding root key. In addition, the protocol publisher and the protocol consumer are provided with a one-way function that can be used to encode information as described below. Method 600 continues at block 602 where a protocol publisher utilizes a UEFI function, for example InstallProtocol(IN EFI_GUID GUID, IN ProtocolPointer) to install a protocol at a protocol database 700. PAC 174 is configured to generate an entry at the protocol database, associating a protocol GUID with a protocol pointer, as illustrated at FIG. 7.

Figure 7:
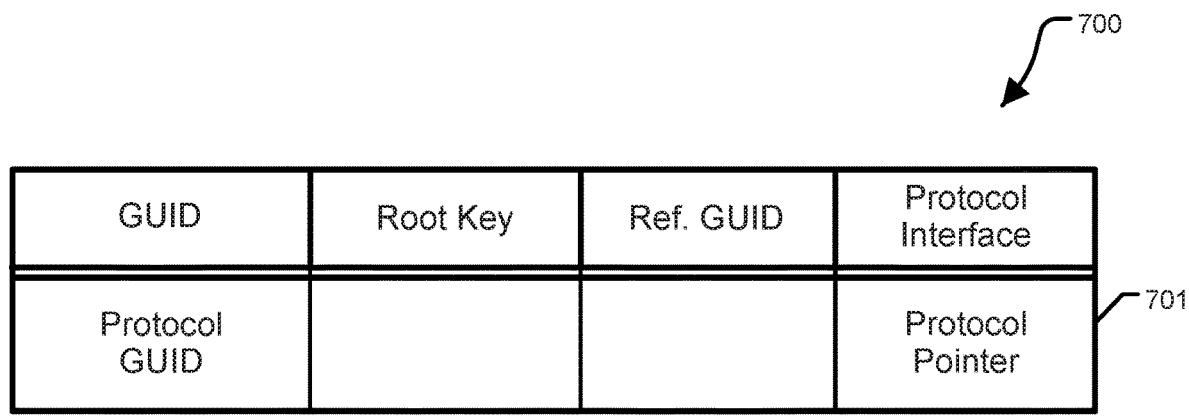
FIG. 7 is a table illustrating a protocol database according to a specific embodiment of the present disclosure.

FIG. 7 shows a protocol database 700 according to a specific embodiment of the present disclosure. Protocol database 700 can be represented as a table having individual columns corresponding to a protocol GUID, a root key, a reference GUID and a protocol interface. Each row of the table represents an entry at database 700, such as entry 701. The protocol publisher can execute the InstallProtocol(IN EFI_GUID GUID, IN ProtocolPointer) function, which specifies the protocol GUID and the protocol pointer to added at entry 701.

Returning to FIG. 6, method 600 continues at block 603 where the protocol publisher registers root key ($R_0$) with PAC 174 using a UEFI function, for example RegisterRootKey(IN EFI_GUID, IN $R_0$), to bind the protocol GUID with the root key $R_0$ at the protocol database. PAC 174 computes a reference GUID, $R_i$, based on the root key, $R_0$, and the protocol GUID using a one-way function, and stores the root key, $R_0$, and the and reference GUID, $R_i$, at entry 701 of protocol database 700, as illustrated at FIG. 8.

Figure 8:
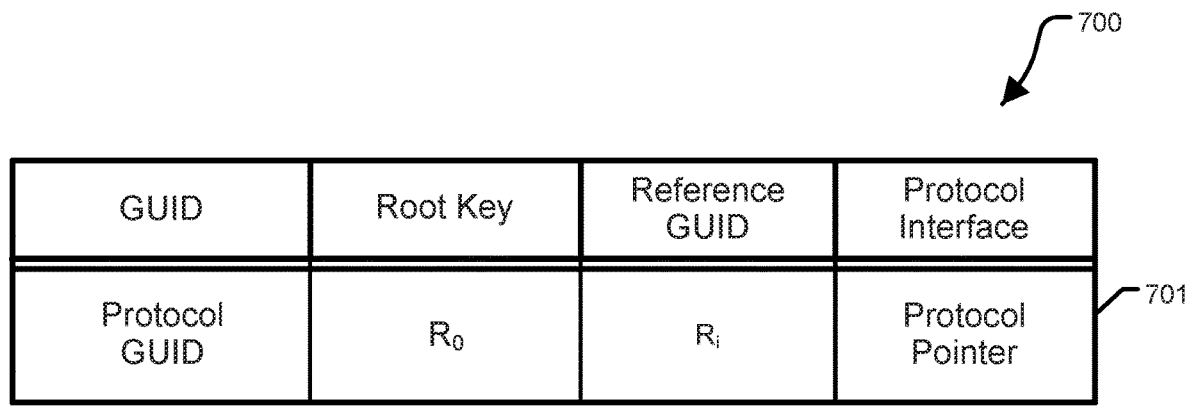
FIG. 8 is a table illustrating a protocol database according to another embodiment of the present disclosure.

FIG. 8 shows the protocol database 700 of FIG. 7 according to a specific embodiment of the present disclosure. In particular, FIG. 8 illustrates the protocol database 700 after the protocol publisher has used the RegisterRootKey(IN EFI_GUID, IN $R_0$) function to bind the protocol GUID with the root key $R_0$ at entry 701 of protocol database 174, and after PAC 174 has generated the reference GUID, $R_i$, using the one-way function.

Returning to FIG. 6, method 600 completes at block 604 where a protocol consumer calculates reference GUID, $R_i$, based on the root key, $R_0$, and the protocol GUID using the one-way function, and utilizes a UEFI function, for example LocateProtocol_2(IN EFI_GUID Ri, OUT ProtocolPointer), to retrieve the protocol pointer corresponding to the reference GUID (and to the original Protocol GUID).

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124, such as software, can be embedded. Further, the instructions 124 may embody one or more of the methods or logic as described herein. In a particular embodiment, the instructions 124 may reside completely, or at least partially, within the main memory 104, the static memory 106, and/or within the processor 102 during execution by the information handling system 100. The main memory 104 and the processor 102 also may include computer-readable media. The network interface device 120 can provide connectivity to a network 126, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 124 or receives and executes instructions 124 responsive to a propagated signal; so that a device connected to a network 126 can communicate voice, video or data over the network 126. Further, the instructions 124 may be transmitted or received over the network 126 via the network interface device 120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
generating an unified extension firmware interface (UEFI) protocol database;
receiving, from a protocol publisher, a first request to install a first protocol at the UEFI protocol database, the first request including a first global unique identifier (GUID) and a first protocol pointer;
storing the first GUID and the first protocol pointer at an entry of the UEFI protocol database;
receiving, from the protocol publisher, a first root key;
storing the first root key at the entry of the UEFI protocol database;
receiving, from a first protocol consumer, a second request including the first GUID;
providing a first random number to the first protocol consumer in response to the second request;
generating a second GUID using a one-way function on the first random number and the first root key;
storing the second GUID at the entry of the UEFI protocol database,
receiving, from the first protocol consumer, a third request including the second GUID, the second GUID generated by the first protocol consumer using the one-way function on the first random number and the first root key; and
providing the first protocol pointer to the first protocol consumer in response to the third request,
wherein a second protocol consumer without access to the first root key is unable to generate the second GUID to access the first protocol pointer; and
preventing the UEFI protocol database from unauthorized access by deleting at least the first random number and the second GUID from the entry of the UEFI protocol database.

2. The method of claim 1, further comprising:
receiving, from the first protocol consumer, a fourth request including the first GUID;
providing a second random number to the first protocol consumer in response to the fourth request;
generating a third GUID using the one-way function on the second random number and the first root key; and
storing the third GUID at the entry of the UEFI protocol database.

3. The method of claim 2, further comprising:
receiving, from the first protocol consumer, a fifth request including the third GUID, the third GUID generated by the first protocol consumer using the one-way function on the second random number and the first root key; and providing the first protocol pointer to the first protocol consumer in response to the fifth request.

4. The method of claim 1, further comprising:
receiving, from a third protocol consumer, a fourth request including the first GUID;
providing a second random number to the second protocol consumer in response to the fourth request;
generating a third GUID using the one-way function on the second random number and the first root key; and
storing the second random number and the third GUID at a second entry of the UEFI protocol database.

5. The method of claim 4, wherein the value of the third GUID is different from the value of the second GUID.

6. An information handling system comprising:
a memory device; and
a firmware image stored at the memory device, the firmware image providing a protocol access controller (PAC) to:
generate an unified extension firmware interface (UEFI) protocol database;
receive, from a protocol publisher, a first request to install a first protocol at the UEFI protocol database, the first request including a first global unique identifier (GUID) and a first protocol pointer;
store the first GUID and the first protocol pointer at an entry of the protocol database;
receive a first root key;
store the first root key at the entry of the protocol database;
receive, from a first protocol consumer, a second request including the first GUID;
provide a first random number to the first protocol consumer in response to the second request;
generate a second GUID using a one-way function on the first random number and the first root key; and
store the second GUID at the entry of the UEFI protocol database,
receive, from the first protocol consumer, a third request including the second GUID, the second GUID generated by the first protocol consumer using the one-way function on the first random number and the first root key; and
provide the first protocol pointer to the first protocol consumer in response to the third request,
wherein a second protocol consumer without access to the first root key is unable to generate the second GUID to access the first protocol pointer; and
preventing the UEFI protocol database from unauthorized access by deleting at least the first random number and the second GUID from the entry of the UEFI protocol database.

7. The information handling system of claim 6, wherein the PAC is further to:
receive, from the first protocol consumer, a fourth request including the first GUID;
provide a second random number to the first protocol consumer in response to the fourth request;
generate a third GUID using the one-way function on the second random number and the first root key; and
store the third GUID at the entry of the UEFI protocol database.

8. The information handling system of claim 7, wherein the PAC is further to:
receive, from the first protocol consumer, a fifth request including the third GUID, the third GUID generated by the first protocol consumer based on the second random number and the first root key; and
providing the first protocol pointer to the first protocol consumer in response to the fifth request.

9. A method comprising:
installing, by a protocol publisher, a first protocol at an entry at an unified extension firmware interface (UEFI) protocol database, the first protocol identified by a first global unique identifier (GUID);
providing, by the protocol publisher, a first root key to the protocol database, the first root key associated with the first protocol;
generating, at a protocol access controller, a second GUID using a one-way function on the first root key and the first GUID;
storing the second GUID at the entry of the protocol database;
generating the second GUID at a first protocol consumer using the one-way function on the first GUID and first root key;
receiving a first protocol pointer at the first protocol consumer in response to a request by the first protocol consumer, the request including the second GUID;
wherein a second protocol consumer without access to the first root key is unable to generate the second GUID to access the first protocol pointer; and
preventing the UEFI protocol database from unauthorized access by deleting at least the second GUID from the entry of the UEFI protocol database.

10. The method of claim 9, further comprising:
providing the first root key to a third protocol consumer;
generating the second GUID at the second third protocol consumer using the one-way function on the first GUID and the first root key; and
receiving the first protocol pointer at the third protocol consumer in response to a request by the third protocol consumer, the request including the second GUID.

* * * * *